(12) United States Patent
Vonsovici

(10) Patent No.: US 7,065,264 B2
(45) Date of Patent: Jun. 20, 2006

(54) OPTIC SYSTEM FOR LIGHT ATTENUATION

(75) Inventor: Adrian Petru Vonsovici, London (GB)

(73) Assignee: Bookam Technologyl, PLC., Northamptonshire (GB)

( * ) Notice: Subject to any disclaimer, the term of this patent is extended or adjusted under 35 U.S.C. 154(b) by 0 days.

(21) Appl. No.: 10/485,970

(22) PCT Filed: Jul. 22, 2002

(86) PCT No.: PCT/GB02/03358

§ 371 (c)(1),
(2), (4) Date: Jan. 13, 2005

(87) PCT Pub. No.: WO03/014813

PCT Pub. Date: Feb. 20, 2003

(65) Prior Publication Data

US 2005/0111812 A1 May 26, 2005

(30) Foreign Application Priority Data

Aug. 8, 2001 (GB) ................................. 0119368.9

(51) Int. Cl.
*G02B 1/295* (2006.01)
(52) U.S. Cl. ................................. 385/6; 385/8; 385/39
(58) Field of Classification Search ...................... None
See application file for complete search history.

(56) References Cited

U.S. PATENT DOCUMENTS 5,970,201 A    10/1999  Anthony et al.
5,974,216 A    10/1999  Nakaya
6,345,142 B1 *  2/2002  Nakazato et al. ............ 385/140
6,856,751 B1 *  2/2005  Oaknin et al. ............... 385/140
2002/0061165 A1 *  5/2002  Kawarai ....................... 385/24
2003/0016938 A1 *  1/2003  Hatayama et al. ........... 385/140
2003/0026518 A1 *  2/2003  Pezeshki et al. ............. 385/14
2003/0180027 A1 *  9/2003  Oaknin et al. ............... 385/140
2005/0111848 A1 *  5/2005  Grubb et al. ................. 398/147

FOREIGN PATENT DOCUMENTS

EP          0926532 A       6/1999
EP          0932067 A       7/1999
JP          2000-305057 A  11/2000

OTHER PUBLICATIONS

Chisai Hirose et al.Novel PLC-based Variable Attenuation Slope Compensator for Ultra-Wide Dynamic Range Operation of EDFAs XP-000993820 pp. 10-15.

* cited by examiner

Primary Examiner—Kaveh Kianni
(74) Attorney, Agent, or Firm—Sughrue Mion, PLLC

(57) ABSTRACT

An optic system including an integrated variable optical attenuating device for attenuating an input optical signal, the integrated optical variable attenuating device including a first electrically controllable attenuating element and a second electrically controllable attenuating element cascaded together, the first attenuating element having a first range of optical attenuation smaller than that of the second attenuating element but requiring less input power than the second attenuating element to switch between levels of attenuation within the first range of attenuation, and wherein the optic system further includes electrical circuitry for controlling the first and second attenuating elements in coordination with one another so as to achieve the desired level of total attenuation of the optical signal.

11 Claims, 3 Drawing Sheets

OPTIC SYSTEM FOR LIGHT ATTENUATION

The present invention relates to an optic system for attenuating an optical signal, and more particularly to an optic system including an integrated variable optical attenuating device.

An example of an integrated variable optical attenuating device is described in co-pending UK application no. GB0019971.5, in which a pin diode is defined about a ribbed waveguide defined in a silicon-on-insulator (SOI) chip. It has been observed that whilst such a device has the advantages of being able to provide a relatively wide range of levels of attenuation, of being relatively polarisation dependent over that wide range of levels and of exhibiting low insertion loss in the off state, it does require a disproportionate level of electrical input power to achieve high levels of optical attenuation.

The present invention provides an optic system including an integrated variable optical attenuating device for attenuating an input optical signal, the integrated optical variable attenuating device including a first electrically controllable attenuating element and a second electrically controllable attenuating element cascaded together, the first attenuating element having a first range of optical attenuation smaller than that of the second attenuating element but requiring less input power than the second attenuating element to switch between levels of attenuation within the first range of attenuation, and wherein the optic system further includes electrical circuitry for controlling the first and second attenuating elements in coordination with one another so as to achieve the desired level of total attenuation of the optical signal.

As mentioned above, the first and second attenuating elements are cascaded together such that they act in series on the input optical signal. In the embodiments described later, the two attenuating elements are placed adjacent to each other, but the advantages of the present invention may also be achieved with other optical components interposed between the two attenuating elements.

As mentioned above, the first attenuating element has a first range of optical attenuation smaller than that of the second attenuating element but requires less input power than the second attenuating element to switch between levels of attenuation within the first range of attenuation. In the case, for example, where both the first and second attenuating elements are designed to give a low level (e.g. substantially zero) of attenuation at zero electrical input power, the electrical input power that would be consumed by the first attenuating element to achieve a greater level of attenuation within the first range of optical attenuations is less than would be consumed by the second attenuating element to achieve the same level of attenuation.

In one embodiment, the first attenuating element is electrically switchable between a first, low level of attenuation and a second, high level of attenuation, and the high-power attenuating element is electrically controllable over a range of attenuation levels between the first and second levels of attenuation, and the electrical circuitry is provided for switching the first attenuating element between the first and second levels of attenuation and for controlling the second attenuating element over a range of attenuation levels between the first and second levels of attenuation in coordination with each other in accordance with the desired level of total attenuation.

In one embodiment, the first attenuating element is of the type whose attenuation/electrical input power characteristic exhibits varying polarisation dependency over a range of attenuation levels (i.e. range of levels of electrical input power), and the first and second levels of attenuation at which the attenuating element is actually operated are selected as those levels of attenuation at which the polarisation dependency is at a minimum.

Embodiments of the present invention are described hereunder with reference to the accompanying drawings, in which:

FIGS. 1(*a*) and (*b*) are views of a system according to a first embodiment of the present invention;

Figure 1A:
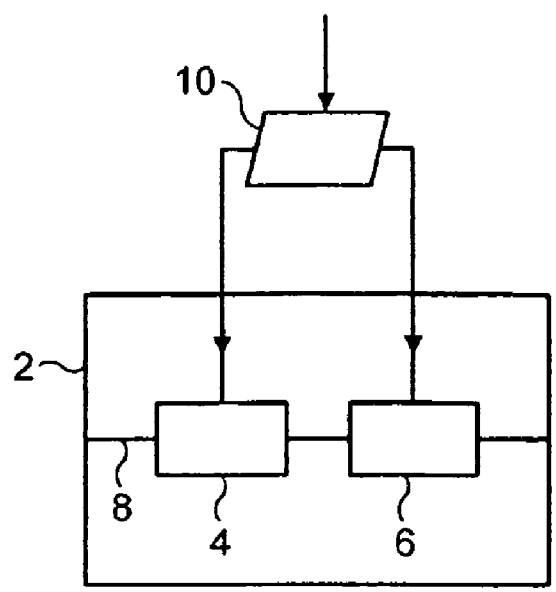
Figure 1B:
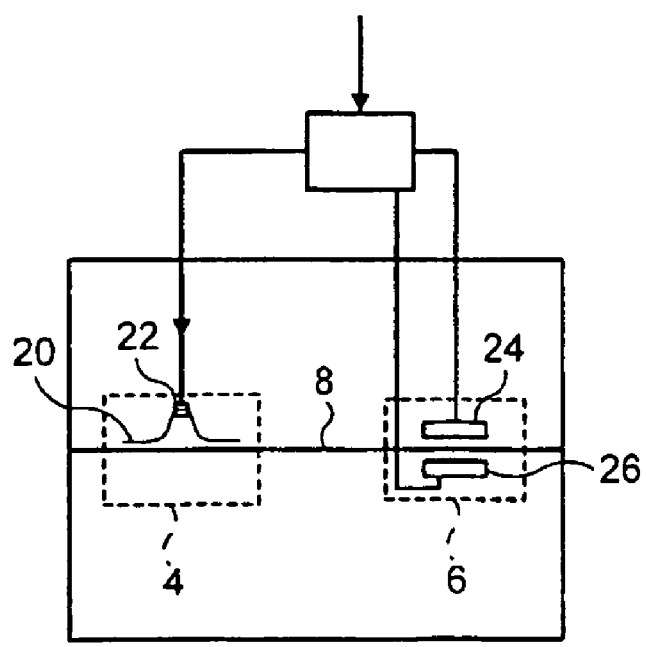

An optic system according to a first embodiment of the present invention is shown schematically in FIG. 1(*a*). The system includes a Mach-Zehnder Interferometer (MZI)-type attenuating element and an in-line attenuating elements (such as, for example, a pin diode attenuating element) monolithically integrated in a silicon-on-insulator (SOI) chip and cascaded together along an integrated waveguide 8, which may, for example, be connected to optic fibres at the input and output ends of the chip. The structure of the each of the two attenuating elements is shown in detail in FIG. 1(*b*).

The MZI-type first attenuating element 4 includes an additional waveguide 20 defined in the SOI chip 2. It is designed such that a portion of the power of an optical signal propagated along waveguide 8 is split into the additional waveguide 20 at the input end and the portions of the signal in each waveguide are recoupled at the output end, with most of the power of the recoupled signal propagated further along waveguide 8. An electrically controllable element 22 is provided for adjusting the refractive index of a portion of the additional waveguide (the reversible injection of charge carriers into the waveguide) and consequently adjusting the effective path length of the additional waveguide 20. By controlling the effective path length of the additional waveguide 20, the phase difference between the signals in the two waveguides at the point where the signals in each waveguide are recoupled at the output end can be adjusted, and hence the attenuation of the signal can be adjusted according to the constructive and destructive interference effects induced by the controlled phase difference.

The in-line attenuating element 6 could be a pin diode attenuating element that includes n-doped and p-doped regions on either side of the waveguide 8, such that charge carriers can be injected into the waveguide upon application of an appropriate voltage across the n-doped and p-doped regions. The injection of charge carriers into the waveguide increases the absorption of the waveguide with respect to the optical signal and thus increases the attenuation of the optical signal. The degree of attenuation depends on the amount of charge carriers injected into the waveguide, which in turn depends on the voltage applied across the n-doped and p-doped regions. The pin diode attenuating element 6 may have a structure as described in co-pending UK patent applications no. GB0019971.5 or GB0104384.3, whose contents are incorporated herein by reference. Alternatively, a different type of in-line attenuating element that operates by absorption effects could be used.

A processor 10 is used to control the attenuating elements in coordination with each other in accordance with a desired level of total attenuation input to the processor. The manner in which the attenuating elements are controlled in coordination is discussed below. The desired level of total attenuation will often depend on the desired level for the average power of the output signal. For example, it may be desired that the power of the output signal lies within a certain range matching the characteristics of the component to which it is subsequently directed, such as a photodiode for converting the optical signal into an electrical signal.

Figure 2:
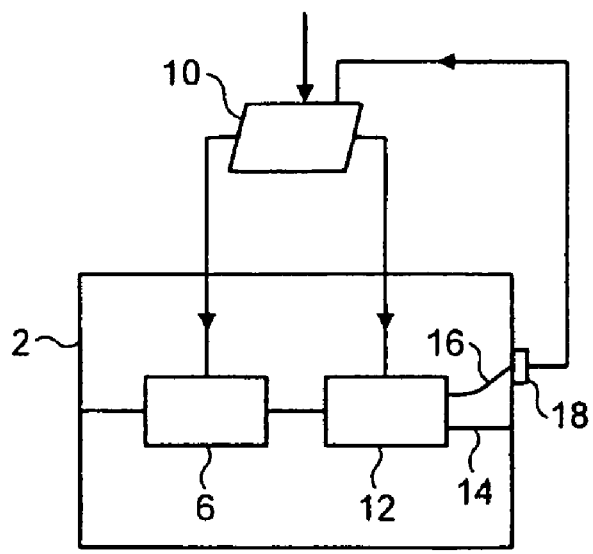
FIG. 2 is a schematic view of a system according to a second embodiment of the present invention.

The embodiment shown in FIG. 2 is an example of an optic system showing how the attenuating elements may, if desired, be controlled with reference to the power of the output signal. The system is similar to that shown in FIGS. 1(a) and (b), with like components being designated by like reference numerals. It differs in that the order of the two attenuating elements is reversed with the pin diode attenuating element being placed at the input end, and in that the residual portion of the recoupled signal in the additional waveguide 20 is directed by means of an integrated waveguide 16 to a photodiode 18, which may be positioned at the edge of the chip 2. The residual portion of the power of the recoupled signal has a known relationship to the power of the recoupled signal in the waveguide 8, and the processor 10 controls the two attenuating elements in accordance with the electric signal generated by the photodiode so as to maintain the average power of the output signal in the waveguide 8 at the desired level.

Figure 3:
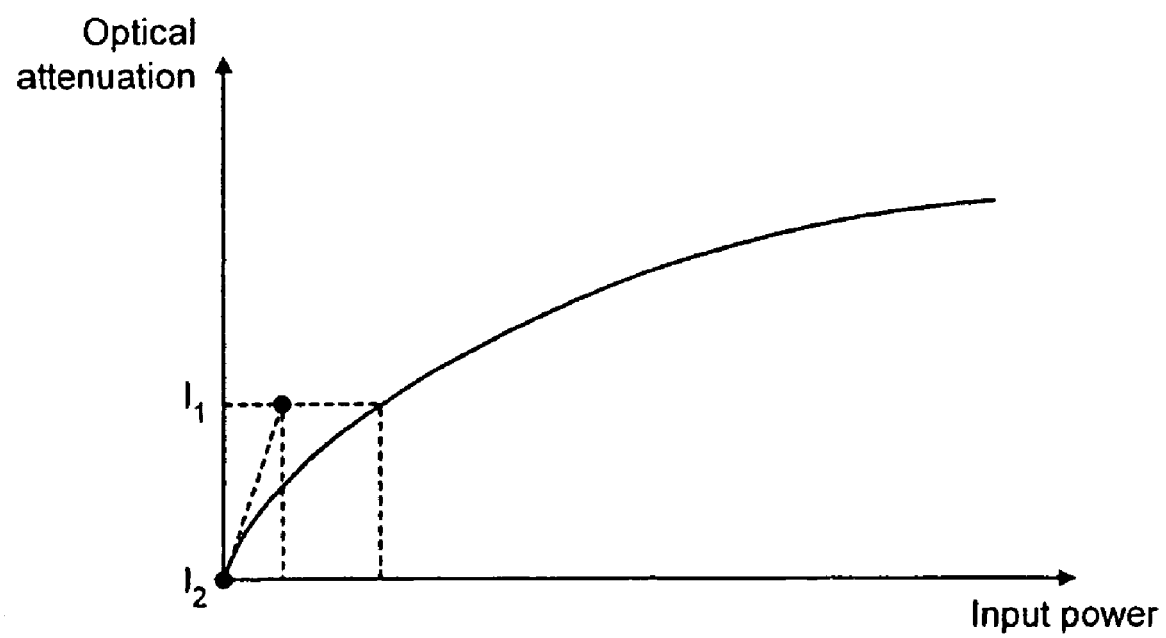
FIG. 3 is a graph showing typical input power/attenuation characteristics for the low power attenuating elements used in the systems shown in FIGS. 1 and 2.

MZI-type attenuating elements (and other types of attenuating elements that operate by interference effects) only provide a limited degree of maximum optical attenuation, but do so for a relatively low power input (where it is designed to be non-attenuating in the off state (i.e. no electrical power input)). In contrast, because pin diode attenuating elements operate by absorption effects, they can be used to attenuate an optical signal to greater degrees than MZI-type attenuating elements, but are relatively power consuming in that the required electrical power input typically increases quadratically with optical attenuation, as shown in FIG. 3 by the solid curved line.

In some applications, it is important that the optic system attenuates an optical signal with relatively small polarisation dependency. Although pin-diode attenuating elements do have the advantage of exhibiting minimal polarisation dependency, MZI-type attenuating elements 4 (and other attenuating elements that operate on interference effects) can have an attenuation/input power characteristic that is relatively polarisation dependent. The potential polarisation dependent effects of the MZI-type attenuating element are minimised in this embodiment of the present invention by the following method of operation.

Figure 4:
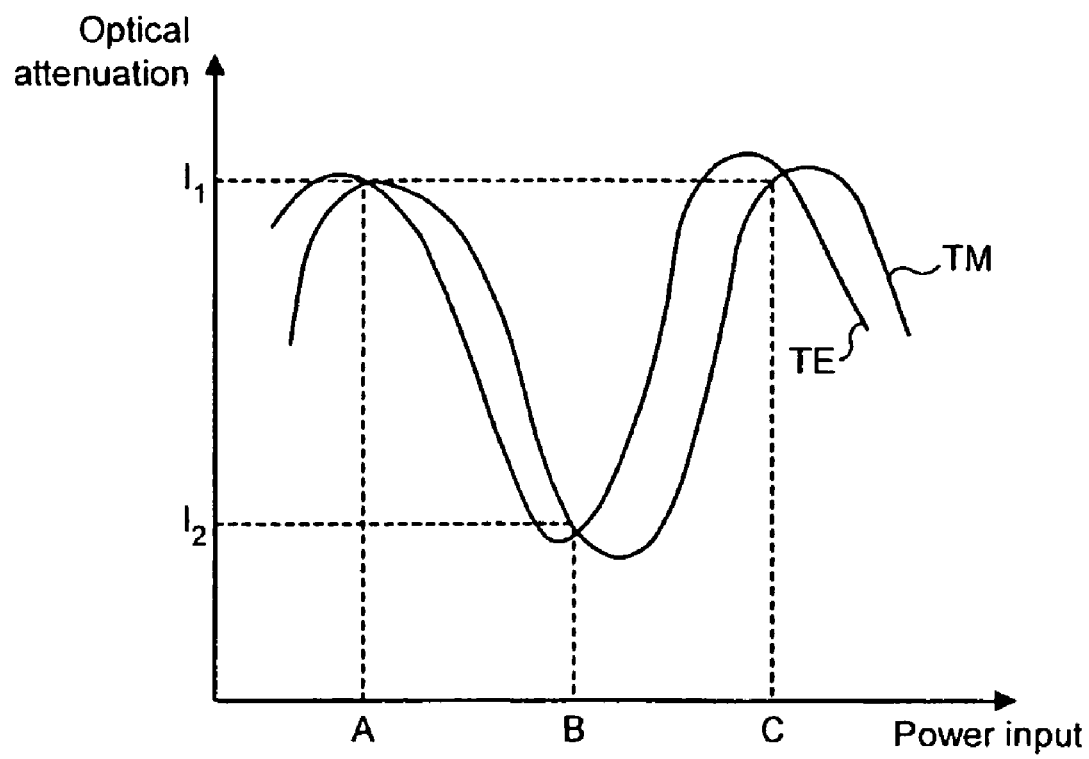
FIG. 4 is a graph showing typical input power/attenuation characteristics for the MZI-type attenuating element for the component TM and TE polarisations of an input signal.

It has been observed that the difference in attenuation between the TM and TE modes for the MZI-type attenuating element varies with the level of input power to refractive index controlling element 22, and that a typical relationship between the level of attenuation for each of the TM and TE modes and the level of electrical input power is as shown in FIG. 4, where there are levels of attenuation where the polarisation dependency, i.e. the difference between the levels of attenuation for the TM and TE modes, is minimized. For example, at input power A, both the TM and TE modes are subjected to a common high level of attenuation, $I_1$, and at input power B, both TM and TE modes are subjected to a common low level of attenuation $I_2$.

Figure 5:
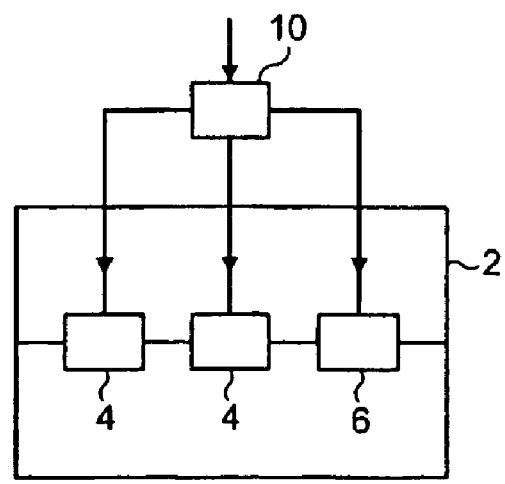
FIG. 5 is a schematic view of a system according to a third embodiment of the present invention.

This characteristic is exploited in the method of operation of this embodiment of the present invention. Where the desired level of total attenuation lies between $I_2$ and $I_1$, the power input to the MZI-type attenuating element is controlled to be B (this could be zero input power, if the MZI-type attenuating element is designed accordingly), and the pin diode attenuating element is controlled to provide the additional level of attenuation necessary to achieve the desired level of total attenuation. Where the desired level of total attenuation is greater than $I_1$, the power input to the MZI-type attenuating element is controlled to be A, and the pin diode attenuating element is controlled to provide the additional level of attenuation required to achieve the desired total level of attenuation.

Where the desired level of total attenuation may be greater than $2 \times I_1$, the optic system can be modified as shown in FIG. 5 to increase the power efficiency of the system at these high levels of total attenuation. As shown in FIG. 5, the SOI chip 2 includes an additional MZI-type attenuating element 4 cascaded together with the first MZI-type attenuating element 4 and the pin diode attenuating element 6. Where the desired level of total attenuation is greater than $2 \times I_1$, both the power inputs to the two MZI-type attenuating elements are controlled to be A, and the pin diode attenuating element is controlled to provide the additional level of attenuation required to achieve the desired total level of attenuation.

For example, each MZI-type attenuating element could be operated by switching between substantially zero attenuation (at zero electrical input power and a −10 dB level of attenuation at an increased level of electrical input power, and the pin diode attenuating element could be operated to provide any additional level of attenuation up to a maximum level over −20 dB depending on the desired level of total attenuation.

As shown in FIG. 4, the power input required to achieve the level of optical attenuation, $I_1$, is greater for the pin diode attenuating element (whose characteristic is shown by the solid curved line) than for the MZI-type attenuating element, whose input power to achieve the level of optical attenuation, $I_1$, is shown as a solid dot. The optic systems and their method of operation described above therefore result in improved power efficiency whilst minimising any polarisation dependent effects of the MZI-type attenuating element.

In the embodiments described above, 1×1 and 1×2 MZI-type attenuating elements are used as a low power switch for switching between two discrete levels of attenuation. However, other types of low-power switches may alternatively be used such as digital optical switches, array waveguide gratings and other types of Mach-Zehnder switches, such as a 2×2 MZ switch, which may each be monolithically integrated with a pin diode attenuating element on an SOI chip.

Although not shown in the embodiments described above, other optical components may be defined in the SOI chip. For example, a demultiplexer or multiplexer could be defined on the chip, with each of the plurality of input or output waveguides being provided with one or more MZI-type attenuating element and a pin diode attenuating element.

Furthermore, although the embodiments described above are silicon devices, the present invention is also applicable to integrated devices based on other optical materials such as III–V semiconductors and polymers.

The applicant draws attention to the fact that the present invention may include any feature or combination of features disclosed herein either implicitly or explicitly or any generalisation thereof, without limitation to the scope of any definitions set out above. In view of the foregoing description it will be evident to a person skilled in the art that various modifications may be made within the scope of the invention.

The invention claimed is:

1. An optic system including an integrated variable optical attenuating device for attenuating an input optical signal, the integrated optical variable attenuating device including a first electrically controllable attenuating element and a second electrically controllable attenuating element cascaded together, the first attenuating element having a first range of optical attenuation smaller than a second range of optical attenuation of the second attenuating element but requiring less input power than the second attenuating element to switch between levels of attenuation within the first range of attenuation, and wherein the optic system further includes electrical circuitry for controlling the first and second attenuating elements in coordination with one another so as to achieve the desired level of total attenuation of the optical signal, wherein the first attenuating element is electrically switchable between a first, low level of attenuation and a second, high level of attenuation, and the second attenuating element is electrically controllable over a range of attenuation levels between the first and second levels of attenuation, and wherein the electrical circuitry is provided for switching the first attenuating element between the first and second levels of attenuation and for controlling the second attenuating element over a range of attenuation levels between the first and second levels of attenuation in coordination with each other in accordance with the desired level of total attenuation, and wherein the first and second levels of attenuation are levels of attenuation at which the polarization dependency of the first attenuating element is at a minimum.

2. An optic system according to claim 1 further including an element for measuring an output power of the signal, and wherein the electrical circuitry controls the first and second attenuating elements in coordination with one another with reference to the measured output power so as to achieve the desired level of total attenuation of the optical signal.

3. An optic system including an integrated variable optical attenuating device for attenuating an input optical signal, the integrated optical variable attenuating device including a first electrically controllable attenuating element and a second electrically controllable attenuating element cascaded together, the first attenuating element having a first range of optical attenuation smaller than a second range of optical attenuation of the second attenuating element but requiring less input power than the second attenuating element to switch between levels of attenuation within the first range of attenuation, and wherein the optic system further includes electrical circuitry for controlling the first and second attenuating elements in coordination with one another so as to achieve the desired level of total attenuation of the optical signal, wherein the second attenuating element operates by absorption effects.

4. An optic system according to claim 3, wherein the first attenuating element is electrically switchable between a first, low level of attenuation and a second, high level of attenuation, and the second attenuating element is electrically controllable over a range of attenuation levels between the first and second levels of attenuation, and wherein the electrical circuitry is provided for switching the first attenuating element between the first and second levels of attenuation and for controlling the second attenuating element over a range of attenuation levels between the first and second levels of attenuation in coordination with each other in accordance with the desired level of total attenuation.

5. An optic system according to claim 3 further including an element for measuring an output power of the signal, and wherein the electrical circuitry controls the first and second attenuating elements in coordination with one another with reference to the measured output power so as to achieve the desired level of total attenuation of the optical signal.

6. An optic system including an integrated variable optical attenuating device for attenuating an input optical signal, the integrated optical variable attenuating device including a first electrically controllable attenuating element and a second electrically controllable attenuating element cascaded together, the first attenuating element having a first range of optical attenuation smaller than a second range of optical attenuation of the second attenuating element but requiring less input power than the second attenuating element to switch between levels of attenuation within the first range of attenuation, and wherein the optic system further includes electrical circuitry for controlling the first and second attenuating elements in coordination with one another so as to achieve the desired level of total attenuation of the optical signal, wherein the integrated optical variable attenuating device is a silicon-on-insulator device with the first and second attenuating elements defined in a layer of silicon.

7. An optic system according to claim 6, wherein the first attenuating element is electrically switchable between a first, low level of attenuation and a second, high level of attenuation, and the second attenuating element is electrically controllable over a range of attenuation levels between the first and second levels of attenuation, and wherein the electrical circuitry is provided for switching the first attenuating element between the first and second levels of attenuation and for controlling the second attenuating element over a range of attenuation levels between the first and second levels of attenuation in coordination with each other in accordance with the desired level of total attenuation.

8. An optic system according to claim 6 further including an element for measuring an output power of the signal, and wherein the electrical circuitry controls the first and second attenuating elements in coordination with one another with reference to the measured output power so as to achieve the desired level of total attenuation of the optical signal.

9. An optic system including an integrated variable optical attenuating device for attenuating an input optical signal, the integrated optical variable attenuating device including a first electrically controllable attenuating element and a second electrically controllable attenuating element cascaded together, the first attenuating element having a first range of optical attenuation smaller than a second range of optical attenuation of the second attenuating element but requiring less input power than the second attenuating element to switch between levels of attenuation within the first range of attenuation, and wherein the optic system further includes electrical circuitry for controlling the first and second attenuating elements in coordination with one another so as to achieve the desired level of total attenuation of the optical signal, wherein the first attenuating element attenuates the input optical signal by splitting the input optic signal into portions, inducing a phase difference between the portions, and then recombining the portions.

10. An optic system according to claim 9, wherein the first attenuating element is electrically switchable between a first, low level of attenuation and a second, high level of attenuation, and the second attenuating element is electrically controllable over a range of attenuation levels between the first and second levels of attenuation, and wherein the electrical circuitry is provided for switching the first attenuating element between the first and second levels of attenuation and for controlling the second attenuating element over a range of attenuation levels between the first and second levels of attenuation in coordination with each other in accordance with the desired level of total attenuation.

11. An optic system according to claim 9 further including an element for measuring an output power of the signal, and wherein the electrical circuitry controls the first and second attenuating elements in coordination with one another with reference to the measured output power so as to achieve the desired level of total attenuation of the optical signal.

* * * * *